(12) United States Patent
Gette et al.

(10) Patent No.: US 8,261,512 B2
(45) Date of Patent: Sep. 11, 2012

(54) ROUND BALER

(75) Inventors: Christoph Gette, Tremery (FR); Lionel Hasse, Solgne (FR); Olivier Plenert, Verny (FR)

(73) Assignee: Usines Claas France SAS, St. Remy/Woippy (FR)

( * ) Notice: Subject to any disclaimer, the term of this patent is extended or adjusted under 35 U.S.C. 154(b) by 362 days.

(21) Appl. No.: 12/369,398

(22) Filed: Feb. 11, 2009

(65) Prior Publication Data

US 2009/0202322 A1 Aug. 13, 2009

(30) Foreign Application Priority Data

Feb. 13, 2008 (EP) ..................................... 08101569

(51) Int. Cl.
*B65B 63/04* (2006.01)
(52) U.S. Cl. ................ 53/118; 53/211; 53/588; 100/15; 414/24.5
(58) Field of Classification Search .................... 53/118, 53/210, 211, 203, 389.3, 587, 588; 100/15, 100/88, 89; 414/24.5
See application file for complete search history.

(56) References Cited

U.S. PATENT DOCUMENTS

| 5,046,296 A * | 9/1991 | Drury et al. ..................... 53/211 |
| 5,048,271 A * | 9/1991 | Walton ............................. 53/587 |
| 5,129,215 A * | 7/1992 | Gratton ............................ 53/587 |
| 5,224,323 A * | 7/1993 | Fykse ............................... 53/211 |
| 5,483,785 A * | 1/1996 | DiCarlo ........................... 53/556 |
| 5,799,466 A * | 9/1998 | Underhill ........................ 53/399 |
| 6,457,295 B1 * | 10/2002 | Arnold ............................ 53/211 |
| 6,467,237 B2 * | 10/2002 | Viaud .............................. 53/118 |
| 6,877,293 B2 * | 4/2005 | Underhill ........................ 53/399 |
| 2003/0024407 A1 * | 2/2003 | Ehrenpfort et al. ............... 100/8 |
| 2003/0175096 A1 * | 9/2003 | Korhonen et al. ............ 414/24.5 |
| 2004/0245028 A1 * | 12/2004 | Viaud et al. .................... 177/145 |
| 2005/0217233 A1 * | 10/2005 | Smith et al. ...................... 56/341 |
| 2007/0209530 A1 * | 9/2007 | Viaud ............................. 100/88 |

FOREIGN PATENT DOCUMENTS

| DE | 197 31 520 | 2/1999 |
| DE | 10 2004 033 252 | 2/2006 |
| EP | 0 983 720 | 3/2000 |
| EP | 1 726 204 | 11/2006 |

* cited by examiner

*Primary Examiner* — Thanh Truong
(74) *Attorney, Agent, or Firm* — Michael J. Striker

(57) ABSTRACT

A baler with a bale pressing chamber for agricultural stalk materials is connected with a wrapping device comprising a wrapping table for the enveloping of a bale with foil via at least one support frame carried by a chassis, between the baler and the wrapping device at least one actively driven bale transfer device for the transfer of the finished bale from the bale pressing chamber to the wrapping table of the wrapping device is present, and as a function of the inclination of the baler and/or the wrapping device to the perpendicular the operational sequence of the transfer of the bale from the bale pressing chamber to the wrapping device is controlled.

12 Claims, 2 Drawing Sheets

ROUND BALER

CROSS-REFERENCE TO RELATED APPLICATION

The invention described and claimed hereinbelow is also described in European Patent Application EP 08 10 569.5 filed on Feb. 13, 2008. This European Patent Application, whose subject matter is incorporated here by reference, provides the basis for a claim of priority of invention under 35 U.S.C. 119(a)-(d).

BACKGROUND OF THE INVENTION

The invention relates to a round baler.

With generic round balers having a wrapping device connected downstream the transfer of the round bale from the pressing chamber of the round baler to the wrapping table of the wrapping device, more preferably on uneven terrain, more preferably when travelling down a slope, constitutes a critical problem since more preferably safe bale transfer from the bale pressing chamber to the wrapping device cannot be guaranteed and the economy of the round baler is therefore dependent on this.

From DE 197 31 520 A1 an embodiment of bale transfer has become known wherein the bale ejected from the pressing chamber is directly accepted by the wrapping table which was previously moved into a position below the ejection opening of the round baler. Following this, the wrapping table with bale located thereon is moved into the wrapping position. The disadvantage in this embodiment on the one hand is the insufficient guidance, more preferably also the lateral guidance and securing of the bale during the transfer and the moving of the wrapping table into its wrapping position.

A further embodiment is known from EP 0 983 720 A1. Proposed is a catching device which is arranged between the round baler and the wrapping device in form of a rotatable catching fork. The catching fork provided with lateral guides is rotatably mounted about an axis located near the wrapping device on the basic frame of the wrapping device. Following the opening of the flap of the round baler, the bale is taken up by the catching fork and transferred to the wrapping table. After this, the catching fork immediately swivels into its starting position. More preferably when travelling on slopes there is thus the continued risk that the bale, upon swivelling of the catching fork into its starting position, rolls back from the wrapping table.

Furthermore, a bale-wrapper combination having two activity regions is known from EP 1 726 204 A1, wherein the transfer means perform an active transport function in the first activity region and in the second activity region act through gravity and perform a restraining function that can be adapted to various bales diameters. The disadvantage of this embodiment however is that upon the swivelling of the wrapping table into its starting position the swivelling of the transfer means into its basic position is activated and thus more preferably when travelling on steep slopes, rolling back of the bale from the wrapping table is not completely excluded.

SUMMARY OF THE INVENTION

The present invention is based on the object of avoiding the disadvantages of the quoted prior art and to create a baler for pressing combined with a wrapping device for enveloping a bale which guarantees safe working operation even in extreme slope situations, more preferably when travelling down steep slopes.

In keeping with these objects one feature of the invention resides in a baler system, comprising a baler having a bale pressing chamber for agricultural stalk materials; a wrapping device connected with the baler and having a wrapping table for wrapping of a bale with foil; at least one actively driven bale transfer device for transfer of a finished bale from the bale pressing chamber of the baler to the wrapping table of the wrapping device; and control means configured so that as a function of an inclination of an apparatus selected from the group consisting of the baler, the wrapping device, and both to a perpendicular an operational sequence of the transfer of the bale from the bale pressing chamber to the wrapping device is controlled.

By controlling the operational sequence of the transfer of the bale from the bale pressing chamber to the wrapping device as a function of the inclination of the baler and/or the wrapping device to the plane it is ensured that more preferably when travelling down a slope the bale transfer from the bale pressing chamber via the bale transfer device to the wrapping device can be controlled in accordance with the prevailing slope in order to more preferably avoid rolling back of the bale from the wrapping device even when travelling down extreme slopes and to relieve the operator of the continuous monitoring of the bale transfer when travelling down such slopes.

With an advantageous further development of the baler according to the invention the operational sequence of the bale transfer from the bale pressing chamber to the wrapping device is performed manually by the operator of the baler and/or automatically by means of a control device located on the baler and/or tractor.

Manual control of the operational sequence of the bale transfer has the advantage that the operational sequence can be controlled quickly and individually depending on the estimation of the slope. Automatic control of the operational sequence of the bale transfer through a control device located on the baler offers the advantage that the operator is relieved of the control.

In a further advantageous further development of the invention the baler and/or the wrapping device comprises at least one inclination sensor equipped to sense the inclination of the baler and/or the wrapping device relative to the perpendicular so that the control of the operational sequence of the bale transfer from the bale pressing chamber to the wrapping device can be carried out as a function of the inclination. Here, various embodiments of the inclination sensor, for example in form of a mechanical or electrical or electronic sensor are conceivable.

In the case of automatic control of the operational sequence a control device is advantageously available which is connected with an inclination sensor which generates a sensor value from the inclination of the baler and/or the wrapping device, as a function of which the operational sequence of the bale transfer device and/or the wrapping table takes place, so that even with the baler in operation in extreme slope situations, more preferably during downhill travel, safe bale transfer from the baler to the wrapping device is guaranteed.

An effective and especially safe operational sequence for the bale transfer is possible if the bale transfer device after the completed transfer of the bale to the wrapping device remains in an upper end position and performs a restraining function on the bale present on the wrapping table until the wrapping table has assumed a horizontal position to the perpendicular of the wrapping device, when an inclination of the baler and/or the wrapping device to the plane corresponding to a downhill travel is sensed by the inclination sensor.

In order to bring about the triggering of the actuation of the bale transfer device a sensor is provided in an advantageous further development of the invention which sensor is equipped to determine the reaching of the end position of the bale on the bale transfer device.

In a further advantageous further development of the invention at least one rigid and/or swivelling guide element is arranged laterally in the transfer region of the bale from the bale pressing chamber to the bale transfer device. More preferably the arrangement of at least one swivelling guide element offers the advantage that in this embodiment the lateral guide elements can be arranged very closely in the region of the tail flap of the baler in order to be able to give the bale direct lateral hold upon leaving the bale pressing chamber.

Because the swivelling of the at least one lateral swivelling guide element from a resting position into a working position is performed directly or indirectly by the tail flap or by the bale, safe transfer of the bale to the bale transfer device is guaranteed when travelling parallel with the slope.

In order for the swivelling of the lateral guide elements from the resting position into a working position to take place timely, a sensor is provided on the baler which during the opening operation of the tail flap brings about the swivelling of the lateral guide elements.

In a further advantageous further development of the invention it is provided that the bale transfer device comprises at least one sensor which on assumption of an end position of the bale on the bale transfer device brings about the swivelling of the bale transfer device in vertical direction so that safe transfer of the bale to the wrapping device takes place and rolling-back of the bale in the direction of the bale pressing chamber is prevented at the same time.

In the simplest case the actuation of the at least one swivelling guide element and/or the bale transfer device and/or the wrapping table is performed mechanically. The use of hydraulic, electric swivelling actuators, such as hydraulic cylinders or actuators is conceivable.

In order to be able to complete safe bale transfer to the wrapping device even during extremely steep downhill travel of the baler the bale transfer device is rotatably mounted about an axis transverse to the travelling direction on the frame in order to be able to safely manage the forces which more preferably occur during the transfer of heavy bales.

In a further embodiment of the invention it is proposed that the wrapping table can be swivelled into a loading position, a wrapping position and an unloading position about a horizontal axis of rotation present on the frame. Separate mounting of the wrapping table and the bale overloading device offers the advantage that the forces that occur in each case can be directly absorbed by the support frame of the baler.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
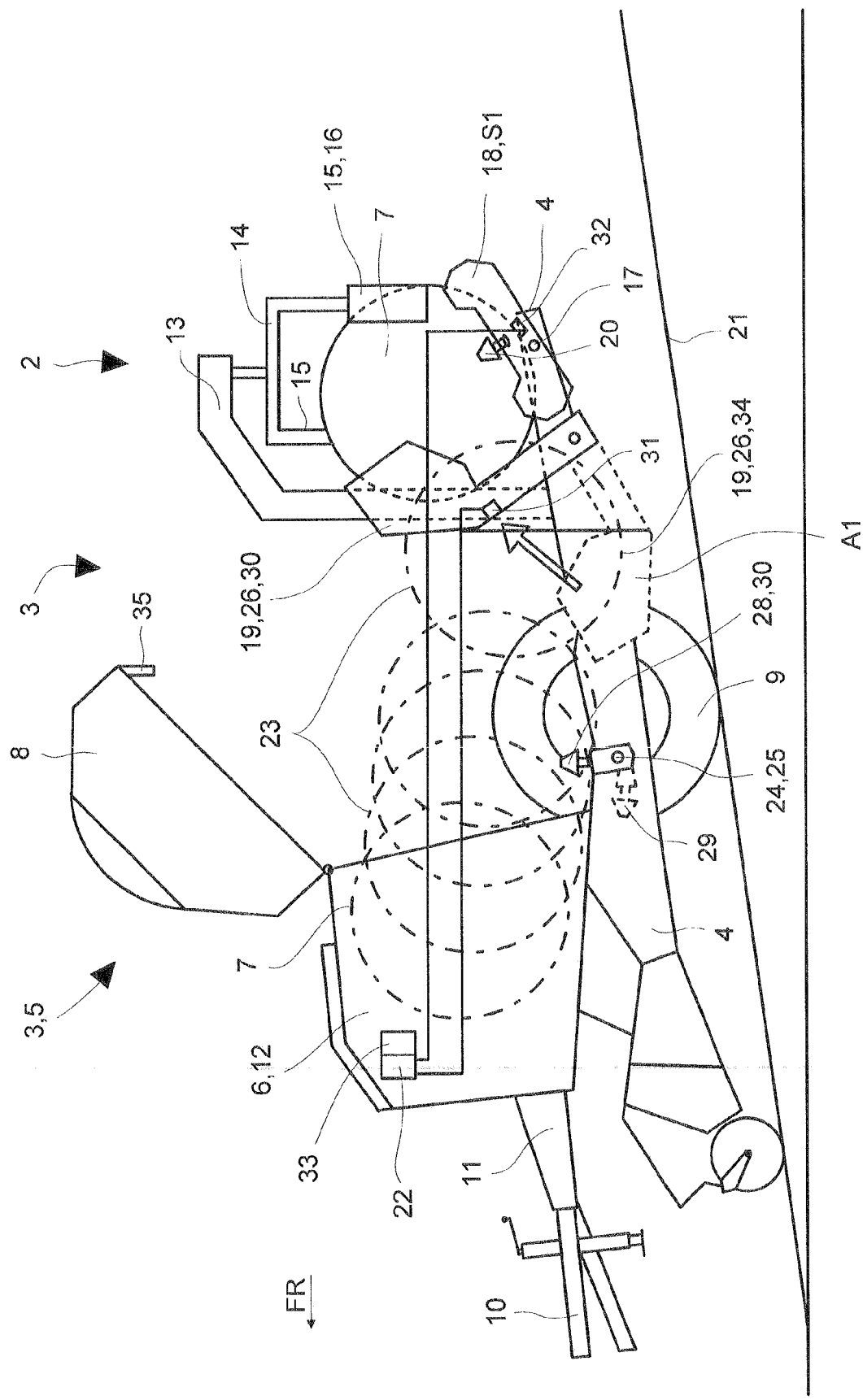
FIG. 1: a bale-wrapper combination during downhill travel in schematic longitudinal section during the bale transfer of the bale from the bale pressing chamber to the bale transfer device

FIG. 1 shows a schematic view of a bale-wrapper combination 3 consisting of a press 1 and a wrapping device 2 during downhill travel which is pulled by a tractor that is not shown. Here, both individual machines 1, 2 are connected via a support frame 4. Other manifestations with individual and separable support frames as well as bale-wrapper combinations 3 as self-drive units are likewise conceivable.

The press 1 embodied as round baler 5 comprises a box-shaped housing 6 which accommodates the wrapping mechanism that is not shown for the bale 7 and in the rear region shows a tail flap 8 capable of swivelling for ejecting the wrapped bale 7. The housing 6 is moveably mounted on idlers 9 on an axis that is not shown, wherein on the housing 6 longitudinal struts 10 which pass laterally are formed which merge with the drawbar 11 in a forward direction. The round baler 5 comprises several conveying elements arranged laterally next to one another which are known per se and are not shown in more detail here. These are set in motion during the harvesting operation and enclose a bale 7 forming in the bale pressing chamber 12 towards the front, top and rear. The fundamental construction and the function of such a round baler 5 are generally known. Reference in this regard is made to DE 10 2004 033 252 A1 whose content is herewith included.

On the rear part of the round baler 5 the support frame 4 carries a wrapping device 2. The wrapping device 2 comprises an outrigger arm 13 on which a rotatably driven U-shaped carrier 14 with two wrapping arms 15, each of which at the end side accommodate a foil dispensing device 16, is provided. In addition, the wrapping device 2 comprises a wrapping table 18 capable of swivelling about an axis of rotation 17 present on the support frame 4. The wrapping table 18 consists of a swivel frame 19 which, not shown here, comprises circulating rollers which in longitudinal direction are covered with a plurality of conveyor belts which are not shown in detail, on which the bale 7 comes to rest. The circulating rollers can be driven via a chain drive which is not shown, which chain drive during the enveloping operation ensures rotation of the bale 7 over the circumference so that said bale can be enveloped over the entire running surface and the end faces.

Laterally, a guide element 20 for the lateral guidance of the bale 7 is associated with the swivel frame 19 of the wrapping table 18. It is also conceivable that the rear end of the wrapping table 18 is equipped with a holding element that can be folded down in order to prevent rolling away of the bale 7 against the travelling direction of the bale-wrapper combination 3 and to make possible placement of the wrapped bale 7 on the field ground 21. In the region between the round baler 5 and the wrapping device 2 is located a transfer region in which the finish-pressed bales 7 ejected from the press 1 are accepted and transferred to the wrapping device 2. Here, this transfer region influences the functioning and efficiency of the bale-wrapper combination 3 to a particular degree. When travelling on slopes the bale-wrapper combination 3, more preferably steep downhill travel, safe transfer of the bale 7 from the bale pressing chamber 12 to the wrapping device 2 until a wrapping position is assumed is not guaranteed, since the operational sequence of the bale transfer is optimised only for operation in the plane.

According to the invention the operational sequence of the function elements for the transfer of the bale 7 from the bale pressing chamber 12 to the wrapping device 10 is now controlled as a function of the inclination of the press 1 and/or the wrapping device 2 to the plane, so that safe bale transfer of the bale 7 from the bale pressing chamber 12 to the wrapping device 2 taking into account the slope can always take place and the operator is largely relieved of the monitoring of the bale transfer. Here, the control of the operational sequence can be performed manually via operating elements which are not shown in detail and/or automatically via a control device 22. As is now shown in more detail in FIG. 1, the finish-pressed bale 7, following the opening of the tail flap 8, in accordance with the dash-dotted positions 23, via a rolling frame 24 following the bale pressing chamber 12 below the tail flap 8, reaches the bale transfer device 26 located in a starting position $A_1$ and capable of swivelling about an axis of rotation 25 in a rolling manner.

The bale transfer device 26 is designed in a rectangular shape and comprises lateral frames 27 laterally articulated on the support frame 4 which side frames are connected with cross members which are not shown. The cross members in turn are connected with longitudinal struts which are not shown to support the bales, which struts can be constructed trough-like in accordance with the shape of the bales. The bale transfer device 26 can also be embodied adjustable in length to adapt to different bale diameters. For the safe lateral guidance of the bale 7, more preferably when travelling across the slope, guide elements 28 rotatably mounted at the end of the rolling frame 24 within the support frame 4, whose positioning means which are not shown such as for example an hydraulic cylinder, are connected with the control device 22, which on opening of the tail flap 8, brings about the swivelling of the guide elements 28 from the rest position 29 shown in dash-dotted line into a working position 30.

Establishing the opening state of the tail flap 8 takes place by means of a sensor 35 provided on the tail flap 8. Through the embodiment of the lateral guide elements 28 in a manner capable of swivelling, a position directly below the tail flap 8 is made possible compared with rigid guide elements, without having to fear a collision when the tail flap 8 is opened. In addition it is conceivable that the guide elements 28 are directly arranged on the support frame 4 in a swivelling manner. For sensing the opening state of the tail flap a sensor 31 operationally connected with the control device 22 is present.

On swivelling of the bale transfer device 26 by means of for example a hydraulic cylinder which is not shown here the front end of the bale transfer device 26 is lifted from the starting position $A_1$ in the direction of the arrow until the bale 7 through its own weight rolls into the catching trough of the wrapping table 18.

Figure 2:
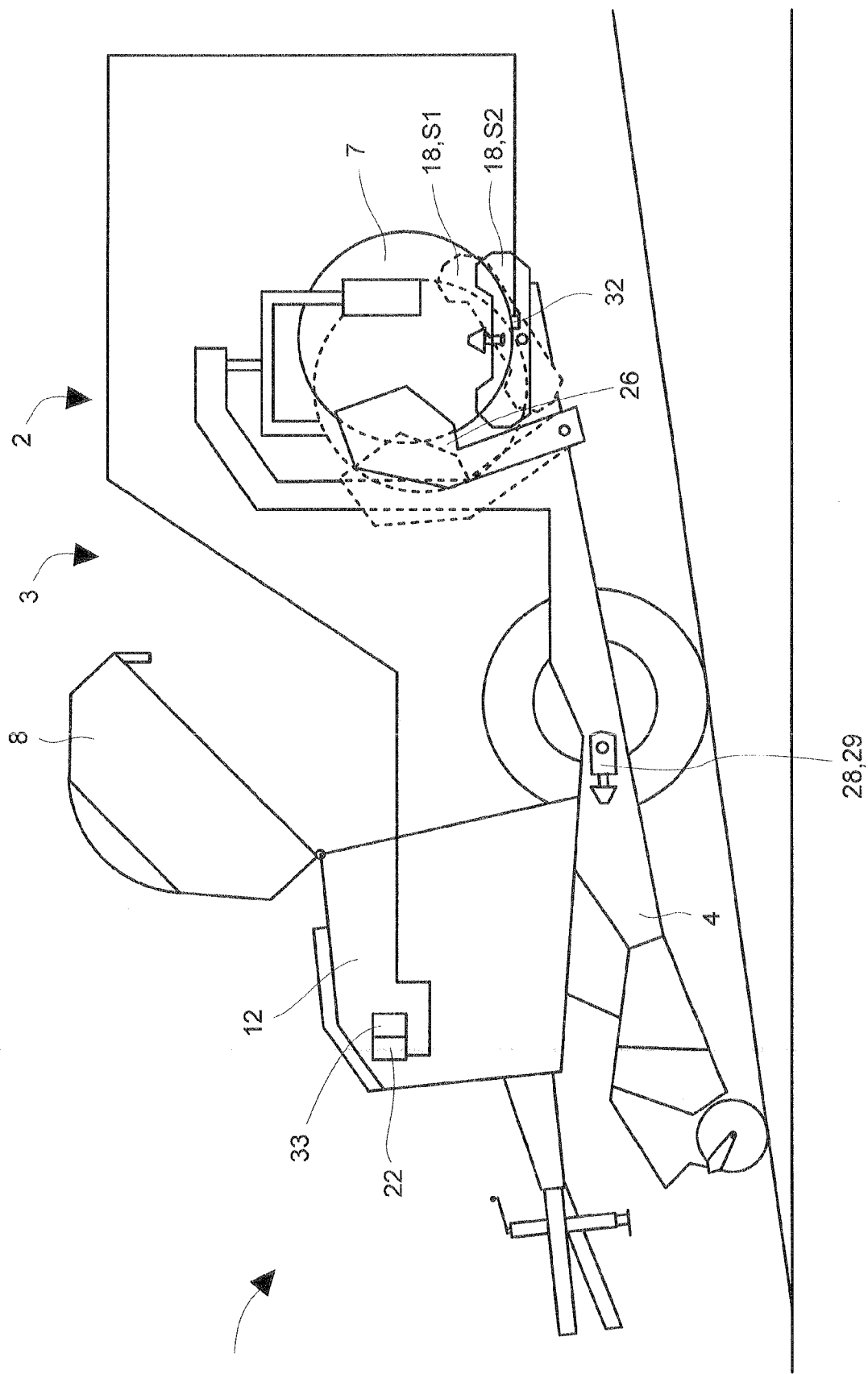
FIG. 2: as FIG. 1, wherein the wrapping table of the wrapping device is in wrapping position

As is now shown in more detail in FIG. 2, the end position of the bale 7 on the wrapping table 18 embodied trough-like is sensed by means of a touch sensor 32 arranged on the wrapping table 18, which passes a corresponding signal onto the control device 22. In the event that that operation is carried out in non-hilly terrain the control device 22 then brings about direct swivelling of the bale transfer device 26 into the starting position $A_1$ shown in FIG. 2 as soon as the swivelling of the wrapping table 18 into the wrapping position $S_2$ is started, so that the wrapping process for enveloping the bale 7 can be started without delay. Swivelling of the wrapping table 18 is performed by means of hydraulic cylinders which are not shown in more detail on the support frame 4 and articulated on the wrapping table. In addition, this signal can be utilised for additional operational sequences as for the swivelling of the lateral guide elements 28 in the position of rest 29 shown here and for the closing of the tail flap 8.

During the operation on steep slopes, more preferably downhill travel, rolling back of the bale 7 from the wrapping table 18 in the direction of the bale-pressing chamber 12 can occur because of the inclination of the bale-wrapper combination 3. According to the invention, an inclination sensor 33 is now provided in the exemplary embodiment in the control device 22 of the round baler 5. In the simplest case, the inclination sensor 33 can be designed as a mercury scale which detects the directions in which the bale-wrapper combination 3 is inclined relative to an absolute position.

The inclination sensor 33 is embodied to generate a signal, preferentially an electronic signal, from which by means of a computer which is not shown here it can be calculated if the bale-wrapper combination 3 is inclined in transverse and/or longitudinal direction. In addition it is conceivable that the inclination determined is indicated to the operator via a display unit in the driver's cab of the tractor which is not shown here, so that the operator is able to manually intervene in the operational sequence of the bale transfer from the bale pressing chamber 12 to the wrapping device 2 by means of suitable means. Because of the inclination of the bale-wrapper combination 3 sensed by the inclination sensor 33, which, as already shown in FIG. 1, corresponds to downhill travel, the further operational sequence of the bale transfer compared with the operation in non-hilly terrain already described in more detail takes place in the manner that during the swivelling of the wrapping table 18 from a loading position $S_1$ accepting the bale 7 and shown here as dash-dotted position 34 into a wrapping position $S_2$ the bale transfer device 26 remains in an upper end position and performs a restraining function on the bale 7 in an almost 90° position to the wrapping table 18, until the wrapping table 18 has assumed its final wrapping position $S_2$ and the bale 7 because of its position designed trough-shaped and the assumed wrapping position $S_2$ of the wrapping table 18, is secured against rolling back.

On reaching the winding position $S_2$ the control device 22 then brings about the swivelling of the bale transfer device 26 in the position of rest 29 shown in FIG. 1, so that the wrapping process for enveloping the bale 7 can commence. After completion of the enveloping operation the wrapping table 18 tilts into an unloading position not shown in detail here for putting the finish-enveloped bale 7 down on the field ground 21. Once the operation for pressing a next bale 7 has been completed, a new bale transfer process as a function of the slope sensed commences.

It will be understood that each of the elements described above, or two or more together, may also find a useful application in other types of constructions differing from the types described above.

While the invention has been illustrated and described as embodied in a round baler, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

The invention claimed is:

1. A baler system, comprising a baler having a bale pressing chamber for agricultural stalk materials; a wrapping device connected with the baler and having a wrapping table for wrapping of a bale with foil; at least one actively driven bale transfer device for transfer of a finished bale from the bale pressing chamber of the baler to the wrapping table of the wrapping device; control means configured so that as a function of an inclination of an apparatus selected from the group consisting of the baler, the wrapping device, and both to a plane, an operational sequence of the transfer of the bale from the bale pressing chamber to the wrapping device is controlled; and at least one guide element arranged laterally, at one side with respect to a direction that is transverse to a travelling direction, in a transfer region of the bale from the bale pressing chamber, which at least one guide element is swivelable about an axis of rotation transverse to the travelling direction, from a position of rest into a working position, directly or indirectly through a member selected from the group consisting of a tail flap, the bale, and both, to laterally hold the bale upon leaving the bale pressing chamber.

2. The baler as defined in claim 1, wherein the control means is configured so that the control of the operational sequence is performed in a manner selected from the group consisting of manually, automatically by a control device, and both.

3. The baler as defined in claim 2, wherein the control means is connected with an inclination sensor which generates a sensor value from the inclination of the apparatus, as a function of which a swivelling of a unit selected from the group consisting of the bale transfer device, the wrapping table, and both is performed.

4. The baler as defined in claim 1, wherein the apparatus selected from the group consisting of the baler, the wrapping device, and both comprises at least one sensor which is configured to sense the inclination of the apparatus relative to the perpendicular.

5. The baler as defined in claim 1, wherein the bale transfer device is configured so that after the bale transfer to the wrapping device it remains in an upper end position and performs a restraining function until the wrapping table has assumed a horizontal position when an inclination of the apparatus corresponding to downhill travel is sensed by an inclination sensor.

6. The baler as defined in claim 1, further comprising at least one sensor, which on reaching an end position of the bale on the bale transfer device, brings about a swivelling of the bale transfer device in a vertical direction.

7. The baler as defined in claim 1, further comprising a sensor which during an opening operation of the tale flap brings about the swivelling of the at least one lateral guide element.

8. The baler as defined in claim 1, further comprising at least one sensor provided on the bale transfer device, which on reaching of an end position of the bale on the bale transfer device, brings about a swivelling of the bale transfer device in vertical position.

9. The baler as defined in claim 1, further comprising actuators selected from the group consisting of mechanical, hydraulic, electrical, swivelling and combined actuators, for a movement of at least one unit selected from the group consisting of the swivelling guide element, the bale transfer device, and both.

10. The baler as defined in claim 1, further comprising a support frame, the bale transfer device being rotatably mounted about an axis positioned across a travelling direction on the support frame.

11. The baler as defined in claim 1, further comprising a support frame, the wrapping table being swivelable about a horizontal axis of rotation present on the support frame into a loading position, a wrapping position, and an unloading position.

12. The baler as defined in claim 1, wherein the at least one lateral guide element, the bale transfer device, and the wrapping table are operationally connected with a display and operating unit operatable from a tractor.

* * * * *